United States Patent
Sebastian et al.

(10) Patent No.: US 6,380,658 B1
(45) Date of Patent: Apr. 30, 2002

(54) METHOD AND APPARATUS FOR TORQUE RIPPLE REDUCTION IN SINUSOIDALLY EXCITED BRUSHLESS PERMANENT MAGNET MOTORS

(75) Inventors: Tomy Sebastian, Saginaw; Sunil Keshava Murthy, Fenton; Buyun Liu, Troy; Scott R Berggren, Saginaw, all of MI (US)

(73) Assignee: Delphi Technologies Inc., Troy, MI (US)

( * ) Notice: Subject to any disclaimer, the term of this patent is extended or adjusted under 35 U.S.C. 154(b) by 0 days.

(21) Appl. No.: 09/616,720

(22) Filed: Jul. 14, 2000

Related U.S. Application Data
(60) Provisional application No. 60/143,887, filed on Jul. 15, 1999.

(51) Int. Cl.[7] .................................................. H02K 1/22
(52) U.S. Cl. ................. 310/261; 310/68 B; 310/156.08
(58) Field of Search ............................. 310/261, 156.01, 310/156.08, 156.57, 156.69, 68 B, 156.06; 318/696

(56) References Cited

U.S. PATENT DOCUMENTS

| | | | |
|---|---|---|---|
| 4,280,072 A | | 7/1981 | Gotou et al. ............... 310/67 R |
| 4,692,645 A | | 9/1987 | Goutou ....................... 310/184 |
| 4,739,201 A | * | 4/1988 | Brigham et al. .......... 310/49 R |
| 5,233,250 A | | 8/1993 | De Filippis ................. 310/156 |
| 5,455,498 A | * | 10/1995 | Kakimoto et al. ........... 318/605 |
| 5,510,689 A | * | 4/1996 | Lipo et al. ................... 318/809 |
| 5,763,976 A | * | 6/1998 | Huard .......................... 310/168 |
| 5,767,601 A | | 6/1998 | Uchiyama .................... 310/190 |
| 5,801,463 A | | 9/1998 | Suzuki et al. .................. 310/51 |
| 5,847,475 A | * | 12/1998 | Rauch et al. ............. 310/49 R |
| 6,144,132 A | * | 11/2000 | Nashiki ....................... 310/156 |

* cited by examiner

Primary Examiner—Nestor Ramirez
Assistant Examiner—Thanh Lam
(74) Attorney, Agent, or Firm—Edmund P. Anderson

(57) ABSTRACT

A method for determining a dimension in a motor is described. By applying Fourier analysis, a sequence of terms is obtained. Since the fifth harmonic is the most undesirable term, the minimization of the fifth harmonic term will make resultant waveform closer to sine wave. Based upon the above, a determination of an angle $\delta$ is described, wherein the fifth harmonic term of the sequence of terms is minimized.

An electric motor having a rotor and a set of slot on said rotor surface having a set of magnets with a width $\delta$ along the circumference of said rotor surface is described. The width $\delta$ is determined by a method that includes applying Fourier analysis thereby a sequence of terms is obtained. Since the fifth harmonic is the most undesirable term, the minimization of the fifth harmonic term will make resultant waveform closer to sine wave. Based upon the above, a determination of an angle $\delta$ is described, wherein the fifth harmonic term of the sequence of terms is minimized.

20 Claims, 1 Drawing Sheet

US 6,380,658 B1

METHOD AND APPARATUS FOR TORQUE RIPPLE REDUCTION IN SINUSOIDALLY EXCITED BRUSHLESS PERMANENT MAGNET MOTORS

PRIOR HISTORY

This application is based upon, and claims the benefit of, U.S. Provisional Application No. 60/143,887, filed Jul. 15, 1999.

TECHNICAL FIELD

This invention relates to a method and an apparatus for torque ripple reduction in electric motors.

BACKGROUND OF THE INVENTION

Electric power steering (EPS) has been the subject of development by auto manufacturers and suppliers for over a decade because of its fuel economy and ease-of-control advantages compared with traditional hydraulic power steering (HPS). However, commercialization of EPS systems has been slow and is presently limited to small and micro-class cars because of cost and performance challenges. Among the most challenging technical issues is the annoying pulsating feel at the steering wheel and the audible noise associated with the type of high performance electric drives needed to meet the steering requirements.

The choice of motor type for an EPS is a crucial one, because it determines the characteristics of the drive and the requirements on the power switching devices, controls, and cost. Leading contenders are the permanent magnet (PM) brushless motor, the permanent magnet (PM) commutator-type and the switched reluctance (SR) motors, each of the three options has its own inherent advantages and limitations.

For the purposes of this invention, PM brushless motors are preferred over commutator-type motors. The large motor size and rotor inertia of commutator-type motors limit their applicability to very small cars with reduced steering assist requirements. Additionally, the potential for brush breakage that may result in a rotor lock necessitates the use of a clutch to disconnect the motor from the drive shaft in case of brush failure. SR drives offer an attractive, robust and low cost option, but suffer from inherent excessive torque pulsation and audible noise, unless special measures are taken to reduce such effects. For column assist applications, the motor is located within the passenger compartment and therefore must meet stringent packaging and audible noise requirements that the present SR motor technology may not satisfy. Therefore, the PM brushless motor with its superior characteristics of low inertia, high efficiency and torque density, compared to commutator motors, appears to have the potential for not only meeting the present requirements but also of future high performance EPS systems of medium and large vehicles.

Despite the relatively low levels of torque ripple and noise of EPS systems using conventional PM brushless motors, they are no match to the smoothness and quietness of HPS with decades-long history of performance refinement efforts. Consumers are reluctant in compromising such features. Therefore, a new torque ripple free (TRF) system is needed, which as the name indicates would eradicate the sources of torque ripple (under ideal conditions) and reduces the noise level considerably. The near term goal is to enhance the performance of EPS systems with the long term objective of increasing acceptability of EPS systems for broader usage.

Several performance and cost issues have stood in the way of broad-based EPS commercialization regardless of the technology used, but with varying degree of difficulty. This requires that following be addressed:

1. Steering Feel: The key to the wider use of EPS is the ability to reproduce the smoothness feel of hydraulic steering systems at affordable prices. Pulsating torque produced by motors would be felt at the steering wheel, if not reduced to very low levels.
2. Audible Noise: The EPS audible noise is mainly emanating from the motor and gearbox. The gear noise is obviously mechanical due to lash caused by manufacturing tolerances. The motor-caused noise is mainly a result of structural vibration excited by torque pulsation and radial magnetic forces in brushless motors and by the commutator/brush assembly in commutator motors.

Typically, to get torque ripple free motor from a sinusoidally excited motor, the induced voltage need to be sinusoidal without any harmonics other than the third harmonics resulting from an analysis such as Fourier analysis. Normally this is achieved by distributing the stator conductors to get a sinusoidal distribution with complementary structures on a stator of the motor.

SUMMARY OF THE INVENTION

The present invention offers advantages and alternatives over the prior art in providing a method and apparatus for torque ripple reduction in sinusoidally excited brushless permanent magnet motors. In practice, a so-called sinusoidal composition of the sinusoidally excited brushless permanent magnet motors is not an ideal or perfect sinusoidal form. Thus, based upon Fourier analysis, it is desirous to minimize or eliminate the unwanted higher order components of the sinusoidal composition.

In an exemplary embodiment of the invention, a method for determining a dimension in a motor is described. By applying Fourier analysis, a sequence of terms is obtained. Since the fifth harmonic is the most undesirable term, the minimization of the fifth harmonic term will make resultant waveform closer to sine wave. Based upon the above, a determination of an angle $\delta$ is described, wherein the fifth harmonic term of the sequence of terms is minimized.

In addition, an electric motor having a rotor and a set of slot on said rotor surface having a set of magnets with a width $\delta$ along the circumference of said rotor surface is described. The width $\delta$ is determined by a method that includes applying Fourier analysis thereby a sequence of terms is obtained. Since the fifth harmonic is the most undesirable term, the minimization of the fifth harmonic term will make resultant waveform closer to sine wave. Based upon the above, a determination of an angle $\delta$ is described, wherein the fifth harmonic term of the sequence of terms is minimized.

DESCRIPTION OF THE PREFERRED EMBODIMENT

It can be appreciated that under ideal condition, a sinusoidal induced signal, be it voltage induced, current induced, magnetically induced, or otherwise induced, is a perfect sine wave. The Fourier analysis of this perfect sine wave would be meaningless in that the sine wave would equal to itself. However, in the real world, under experimental conditions, the so-called sinusoidal composition is not a perfect sine wave. Therefore, a Fourier analysis of the so-called sinusoidal composition will yield more terms than merely itself such as a perfect sine wave. Once it is established that the Fourier analysis yields more terms, the question turns on which terms of the Fourier analysis is more significant.

The concept underlying the instant invention takes into account the fact that the voltage induced in a sinusoidal application is not only a function of the winding distribution, but also a function of the flux density distribution. Thus the magnet pole arc can be designed to eliminate the most significant harmonics such as utilizing Fourier analysis. The most significant harmonics in a STAR (Y) connected motor is the fifth harmonics. The fifth harmonics in the flux density distribution can be eliminated by making the pole arc to be 144 electrical degrees. Or, for a 6-pole motor it is 48 mechanical degrees. This way we can use a one slot per pole per phase (18 slot for a 3-phase 6-pole) and obtain reduced torque ripple.

Figure 1:
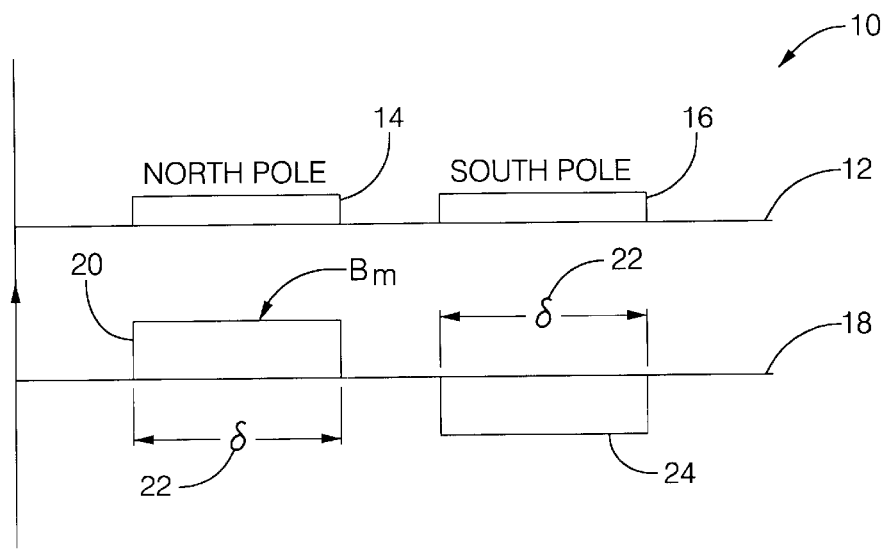
FIG. 1 depicts a relationship between a flux density in the air gap of a sinusoidal excited brushless permanent magnet motor for one electrical cycle (for 2-poles) and poles on a 6-pole motor rotor.

Referring to FIG. 1, a relationship 10 between a flux density in the air gap of a sinusoidal excited brushless permanent magnet motor, and poles on a 6-pole motor rotor is depicted. In an upper horizontal co-ordinate 12, a pair of poles 14, 16 is shown. It is noted that the pair of poles 14, 16 is only partially representative to the instant invention. In an lower horizontal co-ordinate 18, a corresponding flux density in the air gap is depicted. The flux density in the air gap may be written in the Fourier series as:

$$B = \sum_{n=1,3,5...}^{\infty} \frac{4B_m}{n\pi} \mathrm{Sin}(n\delta/2)$$

$B = \Sigma 4 B_m{}^n -$ where $B_m$ is the peak value of the rectangular flux density waveform; and $\delta$ is the width of a magnet in electric angle in relation to a motor shape.

By reducing the fifth harmonic term to zero, or minimizing the fifth harmonic term, we arrive at:

$5\delta/2 = \pi, 2\pi, \ldots$ ,etc.

Thus, an optimum $\delta$ value may be derived.

A positive rectangular flux density 20 corresponds the north pole 14 with a width $\delta$22. A negative rectangular flux density 24 corresponds the south pole 16 with a width $\delta$ 22 as well.

In a STAR or Y-connected motor, the lowest harmonic which will have influence on the torque ripple is the fifth harmonic. Therefore, eliminating the fifth harmonic is important. For example, $5\delta/2 = \pi, 2\pi, \ldots$ , etc. Note that the lower the value of the angle $\delta$, the smaller the dimension of a component incorporating the present invention. Therefore, the value of $\delta$ that maximizes the component incorporating the present invention is:

$\delta = 144$ degrees in electric angle or $\delta = 4\pi/5$.

Figure 2:
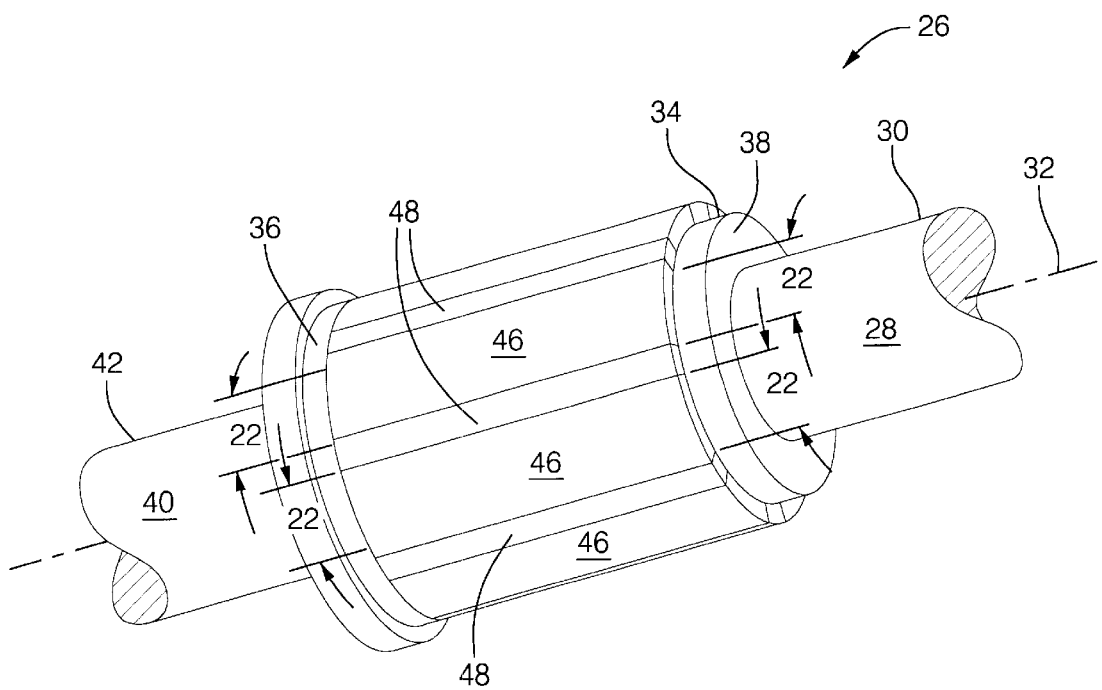
FIG. 2 depicts a rotor for an application of the present invention.

Referring now to FIG. 2, a rotor 26 depicting an application of the present invention described. The rotor 26 includes a first shaft 28 having a elongated shape with a generally cylindrical circumference 30. A center line 32 wherein the first shaft 28 is substantially centered is described. A rotor cylindrical body 34 having a generally cylindrical shape that includes a cylindrical surface 36, a first disk surface 38 receiving the first shaft 28 is described. The center line 32 passes through the center of the a first disk surface 38. The first disk surface 38 is coupled to the first shaft 28 along the center line 32. Correspondingly, a second shaft 40 having a elongate shape with a generally cylindrical circumference 42 is described. The center line 32 wherein the second shaft 40 is substantially centered is described. The rotor cylindrical body 34 having a generally cylindrical shape that includes the cylindrical surface 36, and a second disk surface (not shown) receiving the second shaft 40 is described. The second disk surface is coupled to the second shaft 40 along the center line 32.

The rotor cylindrical body 34 comprises notches or slots that are adapted to receive magnets 46. The magnets 46 will preferably have a generally curved smooth surface that coincides with the cylindrical surface 36, which is also smooth. The generally rectangular smooth surface of the magnets 46 have a width or curvature 22 along the circumference of the rotor cylindrical body 34. Note that a set of segments 48 is equidistantly spaced between the magnets 46. The magnets 46 do not have to be pre magnetized, but rather may be magnetized after assembly onto the rotor. In fact, this latter method is preferred for ease of assembly.

To get good sinusoidal distribution of conductors, normally, it requires the slots per pole per phase to be at least 2. This means, for a 3-phase, 2-pole motor, 12 slots are needed. A 3-phase, 4-pole motor requires 24 slots, and a 3-phase 6-pole motor requires 36 slots.

A higher number of poles is preferred where motor size is an issue, because a larger number of poles means that the stator yoke thickness can be reduced and the motor built smaller. On the other hand if the yoke is made too small, then the number of slots that can be accommodated is limited. For example, with about a 30 mm air gap diameter in a motor, the maximum number of slots that could be accommodated would be around 20 to 25. As a general rule, one is advised to use a 4-pole structure to be able to get a satisfactory sinusoidal distribution.

It can be appreciated that a method for determining a dimension in a motor is described. By applying Fourier analysis, a sequence of terms is obtained. Since the fifth harmonic is the most undesirable term, the minimization of the fifth harmonic term will make resultant waveform closer to a sine wave. Based upon the above, a determination of an angle $\delta$ is described, wherein the fifth harmonic term of the sequence of terms is minimized.

It is further noted that an electric motor having a rotor and a set of slots on said rotor surface having a set of magnets with a width $\delta$ along the circumference of said rotor surface is described. The width $\delta$ is determined by a method that includes applying Fourier analysis so that a sequence of terms is obtained. Since the fifth harmonic is the most undesirable term, the minimization of the fifth harmonic term will make resultant waveform closer to sine wave. Based upon the above, a determination of an angle $\delta$ is described, wherein the fifth harmonic term of the sequence of terms is minimized.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What claimed is:

1. A method for reducing torque ripple in a sinusoidally excited permanent magnet motor, comprising:

applying Fourier analysis to determine a flux density in an air gap between a rotor and a stator of an electric machine, said Fourier analysis providing a sequence of terms including a fifth harmonic term;

minimizing said fifth harmonic term of said sequence of terms and determining an angle δ, said angle δ corresponding to the amount of surface area of said rotor that comprises a magnet.

2. The method of claim 1 wherein said sequence of terms comprising an angle equal to nδ/2 with n being positive integers.

3. The method of claim 1 wherein said sequence of terms comprises an angle equal to nδ/2 with n equal to 1 or 2.

4. The method of claim 1 wherein said electric machine comprises a sinusoidally excited brushless permanent magnet motor.

5. The method of claim 1 wherein said angle □ has an optimal value of 4π/5 electrical degrees for each pair of poles.

6. An electric machine, comprising:

a rotor having a rotor surface;

a plurality of magnets being disposed on said rotor surface, the angular configuration of said plurality of magnets corresponding to an angle δ defining an arc along the circumference of said rotor surface wherein said angle δ is determined by the following formula: 4π/5p wherein p equals the number of pairs of poles of said electric machine and π is in either electrical degrees or radians.

7. The electric motor of claim 6 wherein said angle δ is determined from a sequence of terms comprising an angle equal to nδ/2 with n being positive integers and said sequence of terms relating to the flux density of an air gap between a stator and a rotor of an electric machine.

8. The electric motor of claim 7, wherein said sequence of terms comprises an angle equal to nδ/2 with n equal to 1 or 2.

9. The electric motor of claim 6 wherein said motor comprises a sinusoidally excited brushless permanent magnet motor wherein one magnet is utilized per phase of said motor.

10. The electric motor of claim 6 wherein said angle δ has an optimal value of 4δ/5 electrical degrees for each pair of poles.

11. The electric motor of claim 6 wherein said plurality of magnets are spaced equidistantly on said rotor surface.

12. The electric motor of claim 6 wherein said angle δ corresponds to the configuration of a slot into which each one of said plurality of magnets are disposed in.

13. The electric motor as in claim 12, wherein said angle has an optimal value of 4π/5p electrical degrees where p equals the number of each pair of poles in said motor.

14. The electric motor of claim 6 wherein said angle δ is determined from a sequence of terms comprising an angle equal to nδ/2 with in being positive integers and said sequence of terms including a first value relating to the flux density of an air gap between a stator and a rotor of an electric machine and a second value corresponding to the duration of said flux density.

15. The electric motor as in claim 14, wherein said angle has an optimal value of 4π/5p electrical degrees where p equals the number of each pair of poles in said motor.

16. The electric motor of claim 6, wherein the number of gaps between said plurality of magnets is equal to the number of magnets and said number of gaps are equal in size.

17. The electric motor of claim 6, wherein said plurality of magnets are each separated by an equidistant gap.

18. A method for reducing to torque ripple in a sinusoidally excited permanent magnet motor, comprising:

determining a peak value of a rectangular flux density waveform;

determining a durational value of said rectangular flux density waveform;

applying Fourier analysis using said peak value and said durational value to determine a sequence of terms;

minimizing a fifth harmonic term of said sequence of terms to zero;

determining the value of a variable in said sequence of terms, said variable corresponding to an angle in electrical degrees of a plurality of magnets for positioning on a surface of a rotor of said motor.

19. The method as in claim 18, wherein said angle has an optimal value of 4π/5 electrical degrees for each pair of poles in said motor.

20. The method as in claim 18, wherein said angle has an optimal value of 4π/5p electrical degrees where p equals the number of each pair of poles in said motor.

* * * * *